(12) United States Patent
Stocker et al.

(10) Patent No.: US 7,739,590 B2
(45) Date of Patent: Jun. 15, 2010

(54) AUTOMATIC GENERATION OF PERSONAL HOMEPAGES FOR A SALES FORCE

(75) Inventors: Jeffrey A. Stocker, River Forest, IL (US); Brian M. Greenberg, Scotch Plaines, NJ (US); Joseph Corriero, New Hope, PA (US)

(73) Assignee: Accenture LLP, Palo Alto, CA (US)

( * ) Notice: Subject to any disclaimer, the term of this patent is extended or adjusted under 35 U.S.C. 154(b) by 550 days.

(21) Appl. No.: 10/087,158

(22) Filed: Mar. 1, 2002

(65) Prior Publication Data
US 2002/0152197 A1 Oct. 17, 2002

Related U.S. Application Data

(60) Provisional application No. 60/273,158, filed on Mar. 1, 2001.

(51) Int. Cl.
G06F 15/00 (2006.01)
(52) U.S. Cl. .................. 715/235; 715/234; 715/248
(58) Field of Classification Search ............ 715/500, 715/501.1, 513, 522, 526, 200, 205, 208, 715/234, 235, 248, 273
See application file for complete search history.

(56) References Cited

U.S. PATENT DOCUMENTS

| | | | | |
|---|---|---|---|---|
| 5,940,834 A * | 8/1999 | Pinard et al. ............... 707/102 |
| 5,983,227 A | 11/1999 | Nazem et al. |
| 6,026,433 A * | 2/2000 | D'Arlach et al. ............ 709/217 |
| 6,085,219 A * | 7/2000 | Moriya ...................... 709/200 |
| 6,105,027 A | 8/2000 | Schneider et al. |
| 6,170,014 B1 * | 1/2001 | Darago et al. .............. 709/229 |
| 6,185,587 B1 * | 2/2001 | Bernardo et al. ........... 715/513 |
| 6,216,121 B1 * | 4/2001 | Klassen ....................... 707/1 |
| 6,219,680 B1 * | 4/2001 | Bernardo et al. ......... 715/501.1 |
| 6,247,032 B1 * | 6/2001 | Bernardo et al. ........... 715/530 |
| 6,263,352 B1 * | 7/2001 | Cohen ........................ 715/513 |
| 6,266,684 B1 * | 7/2001 | Kraus et al. ................. 715/513 |
| 6,304,886 B1 * | 10/2001 | Bernardo et al. ........... 715/530 |
| 6,308,188 B1 * | 10/2001 | Bernardo et al. ........... 715/530 |
| 6,313,835 B1 * | 11/2001 | Gever et al. ................. 715/846 |
| 6,345,292 B1 * | 2/2002 | Daugherty et al. .......... 709/214 |
| 6,363,392 B1 * | 3/2002 | Halstead et al. ............. 707/102 |
| 6,415,335 B1 * | 7/2002 | Lowery et al. ................ 710/5 |
| 6,484,149 B1 * | 11/2002 | Jammes et al. ............... 705/26 |
| 6,519,628 B1 * | 2/2003 | Locascio .................... 709/204 |

(Continued)

Primary Examiner—Stephen S Hong
Assistant Examiner—Gregory J Vaughn
(74) Attorney, Agent, or Firm—Brinks Hofer Gilson & Lione (57) ABSTRACT

The present invention is directed to a system for and a method of automatically generating personal homepages accessible through the Internet. The method includes entering data indicative of the identity of a salesperson, harvesting personal data associated with the identified salesperson from a human resource database, and automatically generating a personal homepage by populating the template with the personal data. Preferably, the homepage is automatically disabled when data from the human resource database indicates that the person is no longer employed with the organization.

The system includes an application server linked to a database of personal data of the sales force members. The application server includes a homepage template. Personal data is available in the database to be communicated to the application server to automatically populate the homepage template when requested, thereby generating a personal homepage for the member for viewing on an Internet.

21 Claims, 9 Drawing Sheets

U.S. PATENT DOCUMENTS

| | | | |
|---|---|---|---|
| 6,529,910 B1* | 3/2003 | Fleskes | 707/10 |
| 6,539,379 B1 | 3/2003 | Vora et al. | |
| 6,546,387 B1 | 4/2003 | Triggs | |
| 6,546,397 B1* | 4/2003 | Rempell | 707/102 |
| 6,560,639 B1* | 5/2003 | Dan et al. | 709/218 |
| 6,601,057 B1* | 7/2003 | Underwood et al. | 707/1 |
| 6,631,512 B1* | 10/2003 | Onyeabor | 717/100 |
| 6,651,108 B2* | 11/2003 | Popp et al. | 719/315 |
| 6,684,369 B1* | 1/2004 | Bernardo et al. | 715/513 |
| 6,697,825 B1* | 2/2004 | Underwood et al. | 715/530 |
| 6,701,343 B1* | 3/2004 | Kenyon | 709/204 |
| 6,988,138 B1* | 1/2006 | Alcorn et al. | 709/225 |
| 7,047,302 B1* | 5/2006 | Chatani et al. | 709/229 |
| 7,152,207 B1* | 12/2006 | Underwood et al. | 715/526 |
| 2001/0011235 A1* | 8/2001 | Kim et al. | 705/26 |
| 2001/0032092 A1* | 10/2001 | Calver | 705/1 |
| 2001/0032252 A1* | 10/2001 | Durst et al. | 709/218 |
| 2001/0037344 A1* | 11/2001 | Haji et al. | 707/513 |
| 2002/0016828 A1* | 2/2002 | Daugherty et al. | 709/214 |
| 2002/0022982 A1 | 2/2002 | Cooperstone et al. | |
| 2002/0026336 A1* | 2/2002 | Eizenburg et al. | 705/5 |
| 2002/0073125 A1* | 6/2002 | Bier | 707/530 |
| 2002/0082892 A1* | 6/2002 | Raffel et al. | 705/8 |
| 2002/0133637 A1* | 9/2002 | Popp et al. | 709/315 |
| 2003/0120659 A1* | 6/2003 | Sridhar | 707/100 |

\* cited by examiner

Mr. Financial Consultant — 140
Financial Consultant
U.S. Investor's Group
VICE PRESIDENT 111 Knight Boulevard — 142
Floor 01
Anytown, NY 11375
Phone: 999-123-4567

150 — 90-Day Free Research Trial
[Register] [Login]

Anytown's Branch Homepage — 144

We offer a wide range of Financial Products & Services. If you would like more information about any of these Product & Services, please contact me.

Click here for personal information about Mr. Financial Consultant's qualifications and how he or she can meet your needs. — 146

152 — Our firm on the Web:
[Select Site]

Estate Planning
Latest Research Report on Market Winners
Focus 1 Stock Selections
Priority Client Services
— 148

Dow Jones Industrial Average

Data As of 10:30 AM ET
DJIA   10,825.26  ▼ 109.31  -1.00%
NASDAQ  3,843.53  ▼ .74.04  -1.99%
NYSE     651.93   ▼ 6.90   -1.05%
Market Indexes | Most Active | Market Diaries

— 154

156 — ○ Stock Quotes
○ Stock Charts
○ News by Symbol
○ Research by Symbol
[   ]
Symbol Lookup

Business Philosophy

I concentrate on the financial and investment needs of high-net-worth individuals, small businesses and retired clients. I stress a long-term approach to investing and emphasize financial planning to help my clients determine their financial need and risk tolerance. However, I accommodate investors for whom a short-term speculative investment approach may be appropriate. Portfolio performance and client satisfaction are my primary business objectives. I am committed to providing a high level customer service to all my clients. — 158

Click here for today's Investor News, Midday Report ___ or Closing Report. ___ — 160

Market Awaits Next Week's Rate Hike — 162
Internet Taxes & eCommerce
Bond Strategies: Our Firm's Latest Research Report — 164

This website is not directed to persons in any jurisdiction in which Mr. Financial Consultant is not currently licensed to do business.
Mr. Consultant is currently licensed in the following: AZ, CA, CO, FL, ME, MN, NJ, NY, PA, TX, VT, WI.

*Fig. 8*

The XXXXX Team — 170
Financial Consultant Team
U.S. Investing Group

Our Firm's Name — 142
1234 Main Street
Anytown, NJ 08536
Phone: 609-XXX-XXXX

90-Day Free Research Trial

| Register | Login |

150

Profile

Our team consists of a senior partner, ______ with 15 years of experience with the firm, a junior partner, ______ with 8 years of experience and 3 client associates, Ms. X, Mr. Y, and Ms Z. Click on the name of any financial advisor to see his or her individual home page.
— 172

Our firm on the Web

| Select Site |

152

Business Philosophy

Our team concentrates on the financial and investment needs of high-net-worth individuals and small businesses by helping our clients develop strategies to manage their personal and corporate finances. We stress a long-term approach to investing and emphasize financial planning to help our clients determine their financial needs and risk tolerance. However, we accommodate investors for whom a short-term speculative investment approach may be appropriate. Portfolio performance and client satisfaction are our primary business objectives. We differentiate ourselves by providing exceptional customer service to our clients.
— 174

— 156

○ Stock Quotes
○ Stock Charts
○ News by Symbol
○ Research by Symbol

Products and Services

Our Firm offers a wide range of Financial Products & Services. If you would like more information about any of these Product & Services, please contact me.

Corporate Stock Option Program
Loans Over One Million Dollars — 148
Philanthropic Financial Services ○ Symbol Lookup Today's Highlights: — 162
Is the Internet the right investment for you?
How prudent is investment in European growth markets?
The tax advantage of Municipal Bonds: is it worthwhile for you?

*Fig. 9*

AUTOMATIC GENERATION OF PERSONAL HOMEPAGES FOR A SALES FORCE

This invention claims the benefit of U.S. Provisional Application No. 60/273,158, filed Mar. 1, 2001, which is hereby incorporated by reference herein.

FIELD OF THE INVENTION

This invention is directed to generating Internet homepages and, more particularly, to a system and method for generating Internet homepages for members of a sales force.

BACKGROUND OF THE INVENTION

As electronic commerce and the information economy become more popular, it is important that all organizations, and particularly large organizations, have a presence on the Internet. Nowhere is this more important than in an organization's sales and marketing efforts. While marketing is important to all companies, it is particularly important to companies and organizations where the human channels are the main sales vehicle, such as those offering financial services, such as stocks, bonds, investments, insurance policies, annuities and the like.

It is important for these companies to maintain the personal relationship between the members of their sales force and their customers while taking advantage of the Internet. In addition to resolving channel cannibalization issues, many organizations are fighting the inertia of a sales force that may be uninformed or fearful of the Internet's impact on their job functions. Moreover, conventional methods for creating web pages are labor intensive and require specialized skill sets. These companies need a way to quickly provide an Internet presence for the members of the sales force to maintain the human personal contact to their current customers who may be increasingly embracing doing business in an impersonal manner over the Internet. These companies need a vehicle to quickly provide their sales force with a relevant presence on the Internet that complements, rather than competes, with the companies other Internet marketing initiatives.

SUMMARY OF THE INVENTION

The invention provides a system and method for automatic generation of personal web pages for members of a sales force of an organization. One embodiment of the system includes an application server linked to a database containing personal data describing sales force members. The application server includes a content management server and a content delivery server. The content management server includes a predefined homepage template. Personal data describing the sales force members is available to the application server, which automatically populates the homepage template when requested, thereby generating a personal homepage for the member on the application server. Preferably, the homepage is accessible through the Internet.

One embodiment of the method includes defining a template for a personal homepage, entering data into a computer system that identifies at least one member of the sales force, receiving personal data associated with the identified member from a human resources database, automatically generating a personal homepage for the member by populating the template with the personal data, the personal data communicated from a human resource database, and making the personal homepage accessible through a publicly distributed network, such as the Internet.

Preferably, updated data is periodically retrieved from the human resource database, and the member's homepage is automatically disabled from the Internet when the human resource database indicates that the member's employment with the organization has been terminated. Preferably, the sales force member may customize the homepage by selecting real time content from a plurality of information content sources, and selecting or entering personal descriptive information that populates the homepage.

BRIEF DESCRIPTION OF THE DRAWINGS

FIG. 9 is an exemplary personal homepage for a team of financial consultants.

DETAILED DESCRIPTION OF THE PRESENTLY PREFERRED EMBODIMENTS OF THE INVENTION

The invention helps to retain present customers by generating personal homepages for better and easier access to information about salespersons or financial consultants, as well as services available from the organization. In addition, the homepages for the organization's branch offices help generate additional leads for salespersons, and help enable the sales force to provide more personal and convenient services to on-line clients. Thus, the use of this invention strengthens the relationships between present customers and the sales force, as well as enabling new relationships with new customers.

One embodiment of the invention provides a combination of electronics and software that generates personal homepages for a sales force using personal data stored on the organization's personnel database. Typically, personal data for each salesperson is entered into a computer database, such as a human resources database, when the person is first employed by the organization. The database preferably is resident to a privately accessible distributed network. The data may reside in a single database or file, or may reside over a number of data structures distributed across a company's network. Preferably, the personal data includes biographical data, such as the salesperson's name, address and educational background. The data may include the sales person's qualification, certifications, licenses, and the like. The data may also include a photo portrait or image of the person.

To initiate the process to generate a personal homepage, a salesperson accesses the homepage building application via a Wizard user input interface on a workstation. The person enters data identifying himself into a computer system. Alternatively, the data is provided to the system using a single sign-on protocol on the workstation that authenticates the person's identification and makes such identifying data available to applications accessed via the workstation.

Personal descriptive information about the salesperson may be entered for display on the homepage. For example, if the salesperson is a financial consultant working for an investment broker, the personal descriptive information may include his or her investment preferences and business philosophy, any area of expertise or specialty, or any technical expertise likely to inure to the customer's benefit, for example. Alternatively, to simplify this process, the personal descriptive information may selected from a variety of prepared pre-approved personal descriptive information that the salesperson believes to be relevant.

In addition, the salesperson may select live content information, for example, real-time media, from content providers that may be relevant to the customers. The salesperson's organization or other outside sources may provide the live content information.

The information entered and selected by the salesperson, along with existing biographical data retrieved from a human resources database, are populated in a predefined homepage template. The information so entered, is used to automatically generate a homepage for the salesperson. The homepage is then posted to a Web server for viewing on the Internet or a World Wide Web portion. In some cases, it may be desirable for the homepage to be reviewed by the salesperson's manager for approval when personal descriptive information is entered by the salesperson rather than being selected from pre-approved descriptions.

In addition, each homepage may be made more attractive to a customer by adding information and computer links to other sites favored by the salesperson or the organization.

It is desirable for the employer to prevent access to homepages of salespersons who have left the organization. In a preferred embodiment, when a salesperson leaves the organization, human resources is notified, and an entry in the financial consultant's or salesperson's personnel records is made that he or she is no longer employed by the organization. After this entry is made in the human resources database, when the system receives updated personal data from the human resources database, the system automatically disables any viewing of that person's homepage through the Internet. Likewise, if the salesperson is transferred to a non-sales position within the organization, data indicative of this status may be entered in the human resources database, which then is used to disable the person's homepage.

Figure 1:
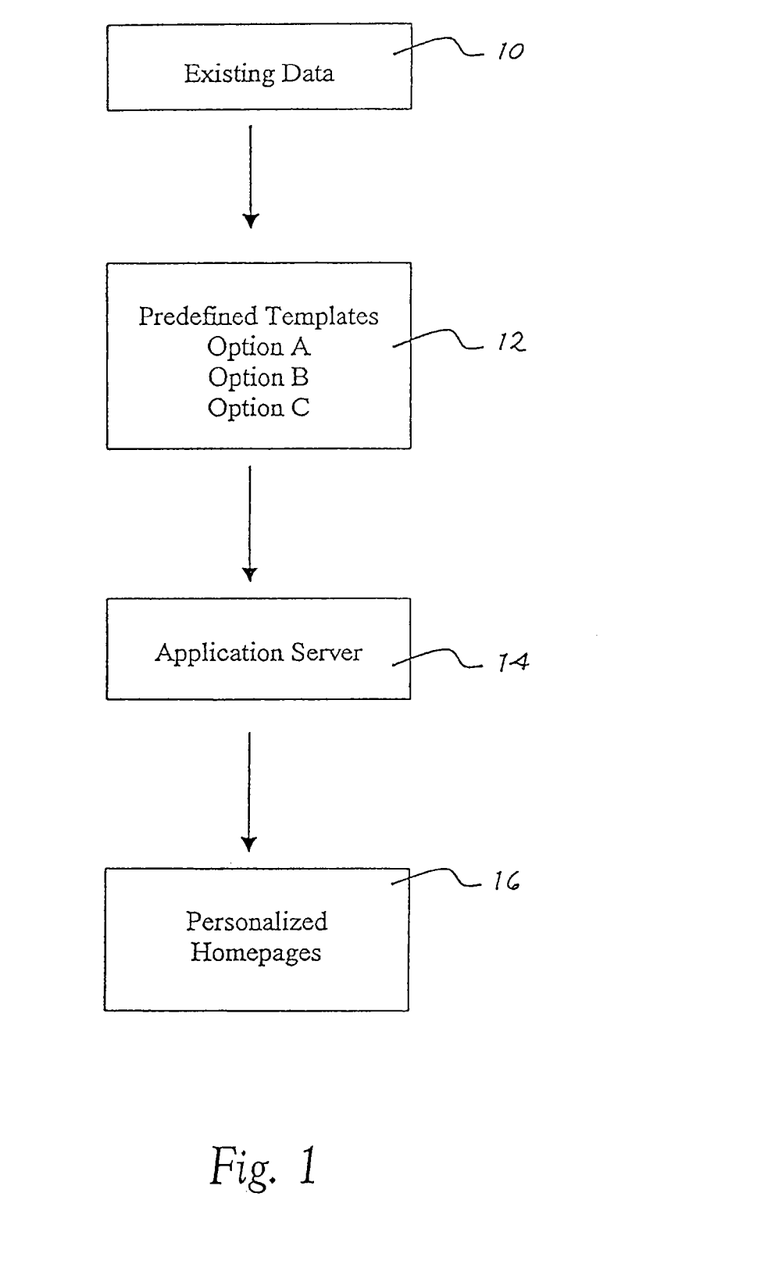
FIG. 1 is a flow chart for generating personal homepages according to a first embodiment.

FIG. 1 depicts a process for generating a personal homepage accessible through the Internet. When a salesperson desires to create a personalized homepage, that person accesses a program, such as a Wizard or user query program, to create the homepage. The person either enters data to identify himself, or the workstation provides such data authenticated by a single sign-on protocol. Typically, when an employee is hired, an organization enters personal data for each employee into a human resources database, or other equivalent database, resident to a private network. This existing personal data is associated with the data identifying the employee. A computer system that includes one or more predefined homepage templates 12 is automatically populated with the existing data 10 associated with the identified salesperson and made available on an application server 14. The application server generates a personalized homepage 16 that is available for access from a publicly distributed network such as the Internet. In this manner a salesperson may allow a customer to view the salesperson's personal homepage by providing the URL for the particular homepage to the customer.

In a preferred method of this invention, the biographical data originates in a human resources database resident in a privately accessible distributed network. A computer system harvests or receives the data residing in the database, and uses the data to automatically generate the personal homepages.

Figure 2:
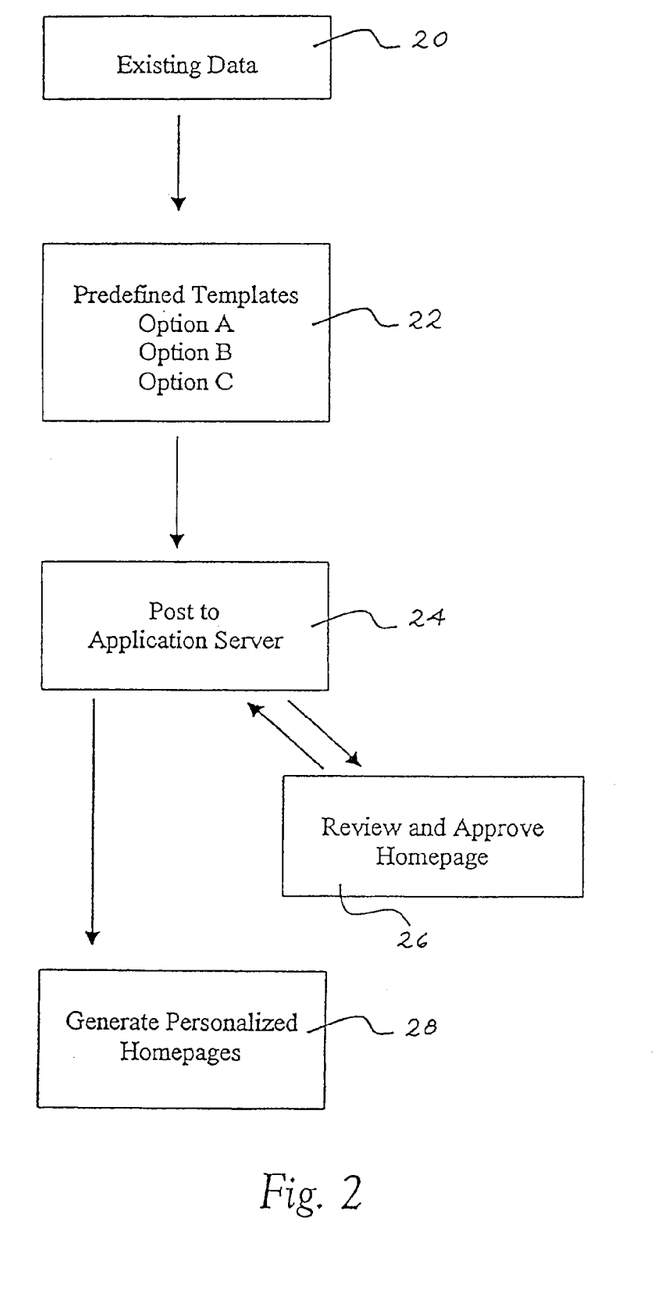
FIG. 2 is a flow chart depicting a process for generating personal homepages.

FIG. 2 is a flow chart of a process that converts the data mentioned in FIG. 1 into personal homepages. Personal data is entered into a computerized database, preferably when the organization hires each salesperson. When it is desired to create a personal homepage, that existing data 20 is retrieved. A template 22 is populated with the data and posted to an application server 24. It may be desirable for the salesperson, or for the organization, to preview and approve the homepage 26. Optionally, one or more managerial levels may be required for approval of each home page before it is posted. After the application server receives indicia of approval, a personal homepage is generated 28 and made available for viewing on the Internet.

Figure 3:
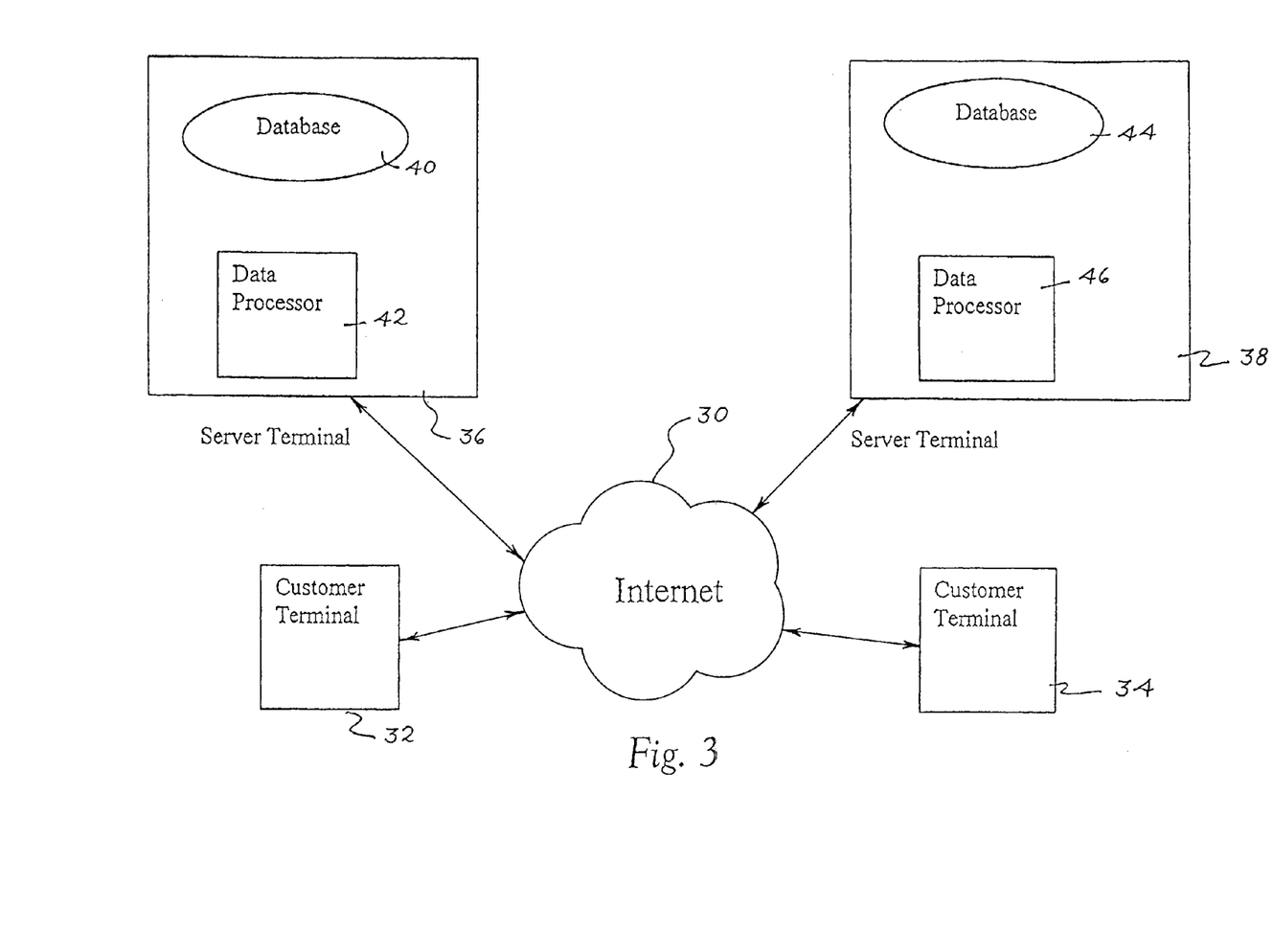
FIGS. 3 and 4 are block diagrams of systems according to preferred embodiments.
Figure 4:
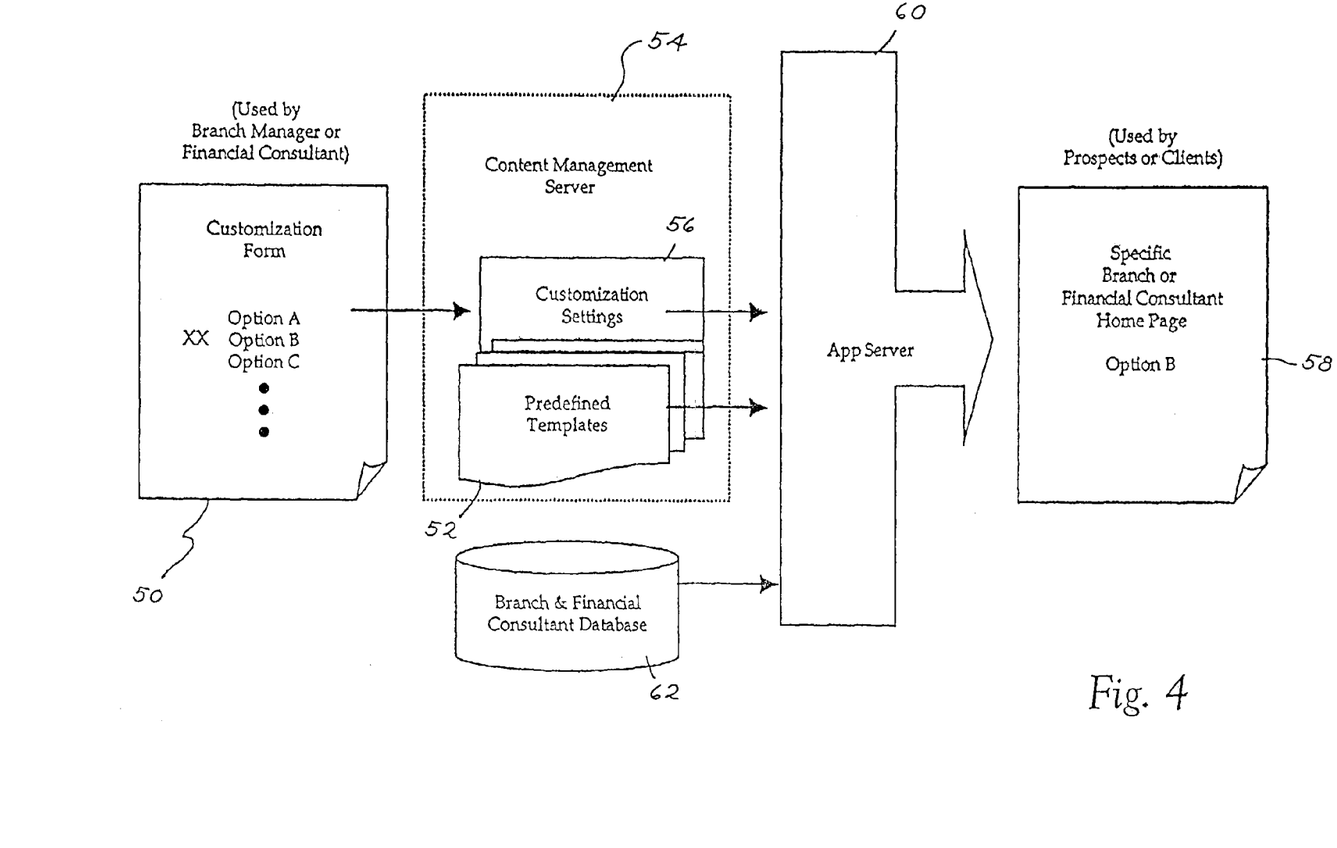

FIGS. 3 and 4 depict computer systems embodying the present invention. FIG. 3 depicts a generalized system in which customer terminals 32 and 34 are coupled with server terminals 36 and 38 through the Internet. In this embodiment, an organization has a server terminal 36 operably connected to the Internet 30 to make personal homepages of its salespersons accessible through the Internet. Alternatively, the organization may have more than one server available for such service, such as a primary server 36 and a backup server 38. Each server has at least a computer memory or database 40 and 44 to store content, and a data processor 42 and 46. The data processors are configured to manage the content available on the server, and deliver the content to remote sites. Preferably, the web servers reside within a hosting facility or an application service provider off-site.

FIG. 4 depicts a computer system tailored to an organization providing financial services. In this embodiment, a financial consultant uses a customization form 50, such as a menu viewable on a graphical user interface on a computer terminal, to select information components for a homepage. The selected information is placed into a predefined template 52, which may reside in a content management server 54 in a local or remote computer or computer system. The template uses any further customization settings 56 programmed in, and personal homepages 58 are generated for each salesperson according to the preferences expressed in the customization form. The personal homepages 58 are desirably reviewed by the individual salespersons or financial consultants, and likely by at least one manager, before they are posted onto an application server 60. The content management software may utilize STORYSERVER software from Vignette Corp., Austin, Tex. Preferably, biographical data of the financial consultants from the human resources database 62 is harvested and inserted into the customized templates on the application server 60. Database 62 may be a computer memory storage device. In FIG. 4, three options are available for use in the custom homepages. As shown, Option B has been selected and used for generating the financial consultant's personal homepage.

In another embodiment of the invention, personal data that was entered into a human resources database about a salesperson is made available to populate a variety of homepage formats associated with the salesperson. The salesperson may create a personal homepage using personal data associated with himself. A manager or senior level salesperson may create a team homepage using the data associated with at least one salesperson, such as the team leader, or all members of the sales team. Also, a branch or local office manager may use data associated with himself to generate a branch homepage or a local office homepage.

Figure 5:
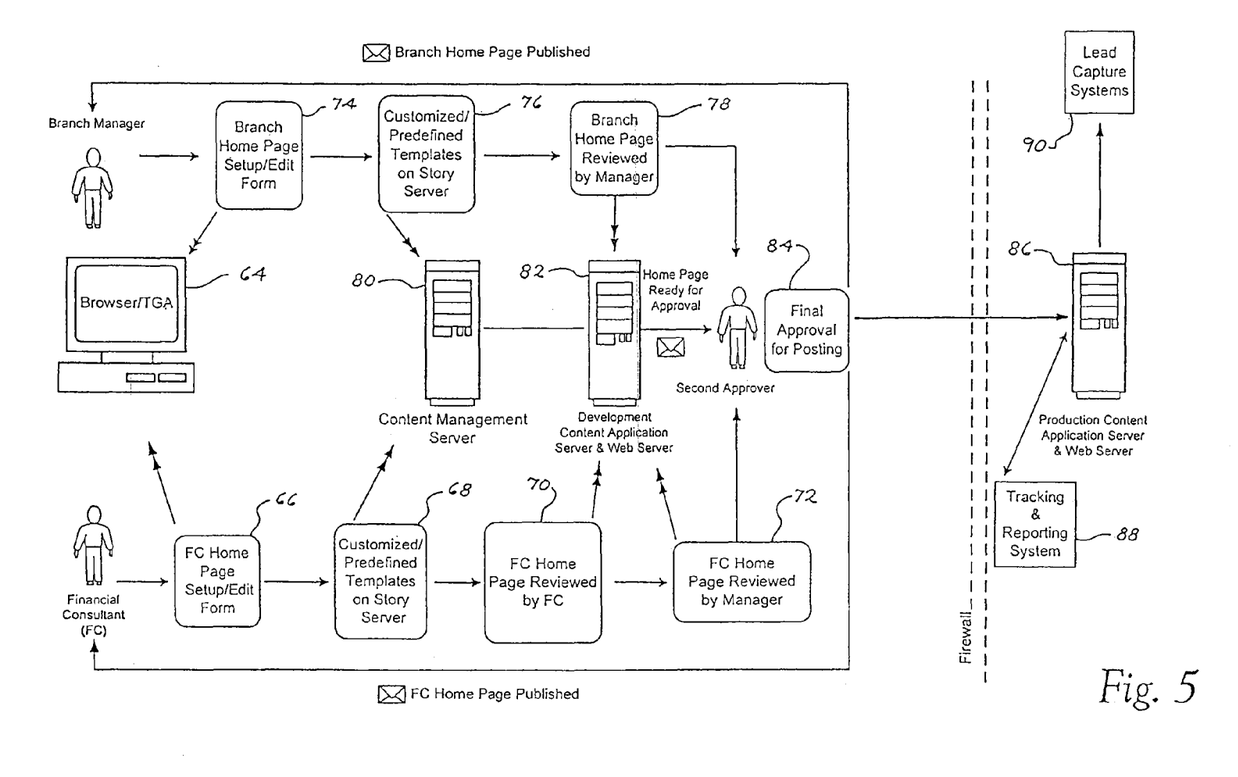
FIG. 5 is a block diagram of a system for generating personal homepages for financial consultants and financial branches.
Figure 6:
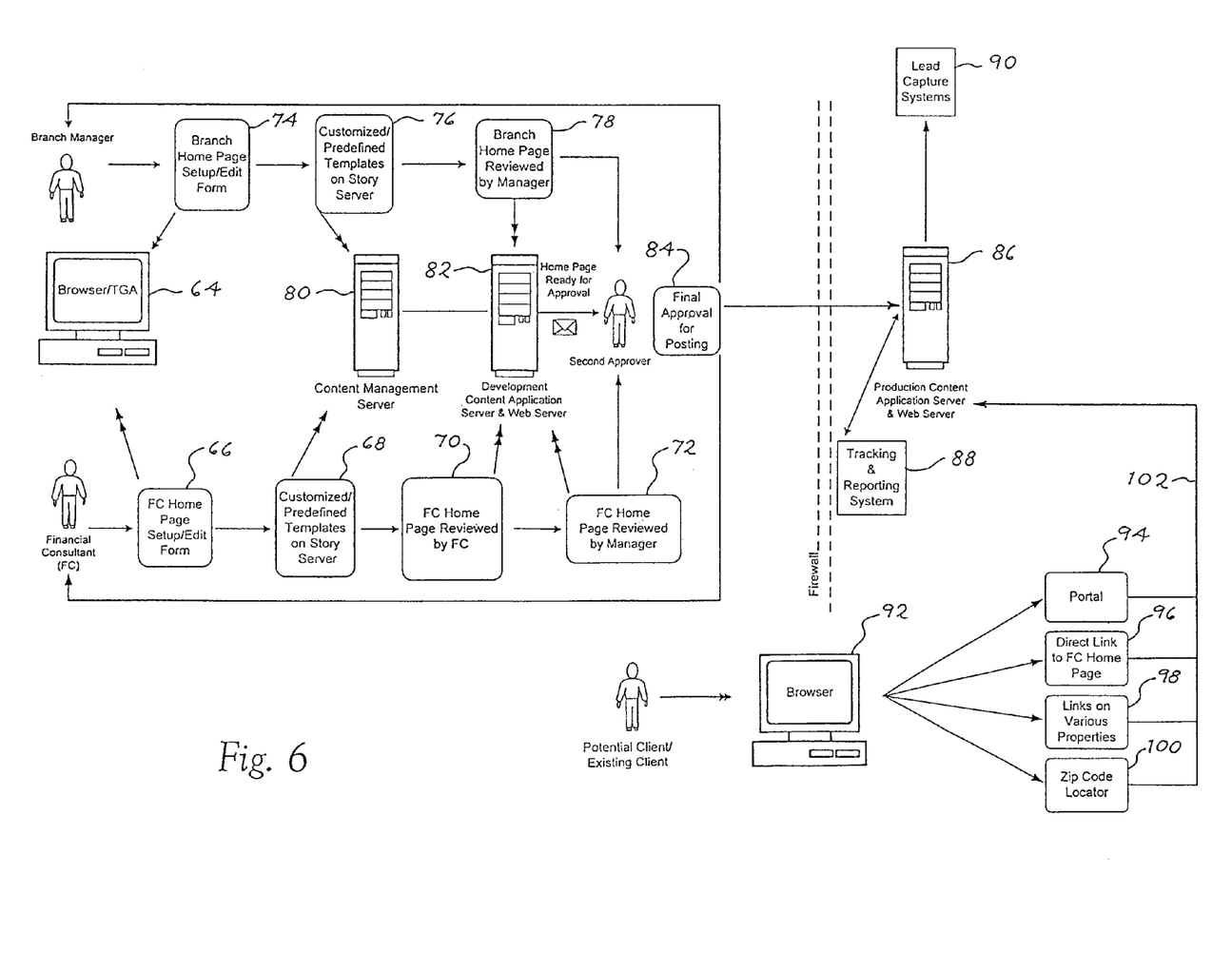
FIG. 6 depicts a block diagram of a system that transfers information between financial consultants and customers using personal homepages via the Internet.

FIGS. 5 and 6 depict a system tailored for financial consultants, using one server for producing homepages and a separate server for posting homepages onto the Internet. As shown, the system includes parallel methods for the financial consultant and for the branch manager in developing and managing the personal homepages of the present invention. A financial consultant may access a Home Page Setup/Edit Form 66 via a browser interface 64. Personal data from a financial consultant is used to generate a personal homepage. The custom or predefined templates 68 are used to generate homepages that may reside on a content management server 80, which includes a database accessible only by internal means. After the templates have been populated with the data to create a personal homepage 70, the homepage may be stored on a developmental content application server 82, and may be accessible only through the organization's Intranet. The salesperson or financial consultant may then review the personal homepage, after which a manager 72 may review it. After these reviews, the homepage may be held up pending second or final approval 84 before being published or posted to a web server 86.

In a parallel process for creation of a team, branch or local office homepage, a manager, such as a branch manager, may also generate a homepage for a team of financial consultants, or for a branch or local office. The manager may set up a branch homepage 74 using an interface 64 to enter appropriate personal data and to select from among at least one template 76. Alternately, a template may be defined or pre-selected by higher management. After the generation and storage of such homepages, for example, on a content management server 80, the pages 78 are reviewed by the manager, and posted to a developmental content application server or Web server 82. After the review, the homepage may be held up pending second or final approval 84 before being published or posted to a web server 86.

Web server 86 may also include ancillary hardware and software, such as a tracking and reporting system 88 to keep track of the number of hits on the Web site, and also to track personal information of the potential clients who access the Web site. This personal information may also be captured in a lead capture system 90, stored, and used for later follow-up by salespersons.

In a preferred implementation, the content management server, the development content application server, and the production content application server and Web server are three separate systems, all three using utilizing the STORY-SERVER software available from Vignette Corp., Austin, Tex.

FIG. 6 depicts a similar system as FIG. 5, with the links of the client to the web server 86 of the financial consultant's organization, as another embodiment of the system. In this embodiment, a client or potential client may interact via the Internet 102 with the system through his or her personal computer 92. The client may interact with the Web server 86 through a local portal 94 of the financial services company, a direct link 96 to a homepage of a financial consultant (if the client has been given the URL of the financial consultant), a link 98 to a branch office homepage through one or more of several properties of the financial services firm, such as other Internet Sites, or advertisement links to the financial services firm. The web server may also utilize a ZIP code locator 100. In response to a ZIP code entered by a customer or potential customer on the customer terminal, the viewed web page is provided a link to or forwarded to a branch office homepage located in or near that entered ZIP code.

As a benefit to the organization, another feature of the invention is useful for capturing marketing data. As shown in FIG. 6, a production content application server/web server 86 aggregates data from persons viewing the financial consultants' homepages and/or branch office homepages, and makes this data available to generate leads for financial consultants or marketing specialists for follow-up.

As a benefit to the customer, the personal homepage of a salesperson may be considered a "local portal" allowing a customer access to many links and services of the organization. By logging onto the homepage of the individual salesperson or financial consultant, the customer may access many other remote sites considered interesting and informative by the organization employing the sales force. These links may bring news and other information to the customer pertinent to the goods and services they receive from the organization, thus adding value to the customer via this "virtual" salesperson-customer relationship.

Figure 7:
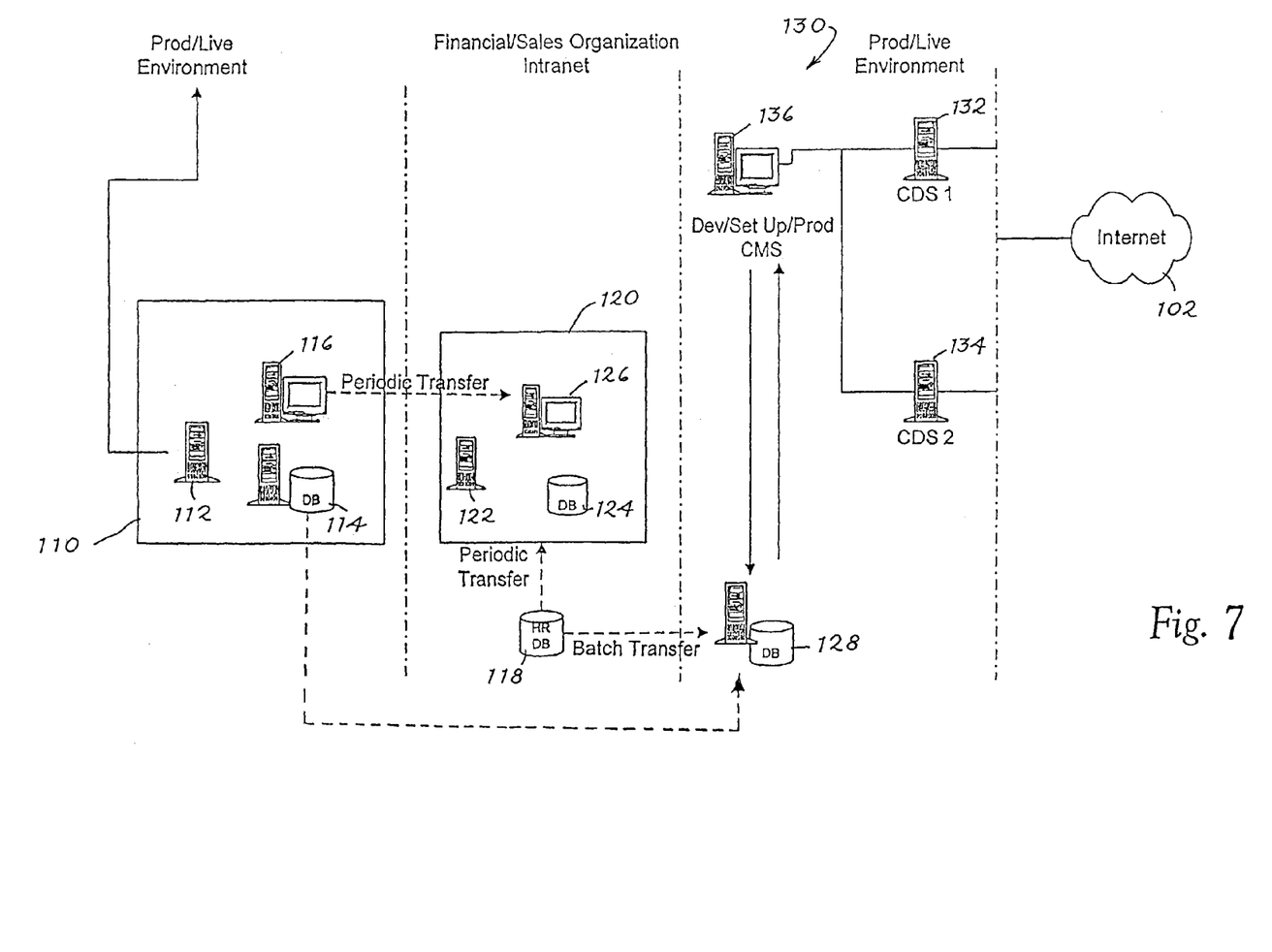
FIG. 7 is a system, showing another embodiment of the invention.

As shown in FIG. 7, the computer system features several servers for storing, processing, and making the information contained in personal homepages available on the Internet 102. One embodiment of the system includes a remote content server 110, a local server 120, and a development/set up/production server 130. Each of these servers, 110, 120, and 130, may include a content management server, 116, 126, and 136, respectively, to manage content workflow. The servers may also include content delivery servers 112 and 122, and the production server 130, which posts pages to the Internet, may include one or more content delivery servers 132 and 134. The servers also include databases or computer memory storage devices 114, 124, and 128. A database of human resources data 118 is available to the system.

In the embodiment depicted in FIG. 7, a remote content server 110 retrieves information and content useful for the personal, team and local office homepages. The remote content server 110 feeds content to the organization's local server 120 and to the production server database 128. The local server 120 is preferably used as a development server that develops and tests concepts or allows pre-published internal viewing of the personal homepages. Server 130 is configured to allow an environment to develop, setup and produce personal, team and local office homepages. Server 130 may also comprise one or more content delivery servers 132 and 134 configured primarily as production Web servers, on line with the Internet 102, to allow users to view the homepages generated by the system. Other architectures or arrangements of equipment are possible, as will be realized by those skilled in the art, in alternative embodiments for the invention.

It may be useful for the organization employing the salesperson to obtain a modicum of information from a potential customer. For instance, it may be desirable to channel a customer or investor into a branch or office near the customer's or investor's residence or workplace, in order to foster a relationship between the customer or investor and a salesperson. Thus, in one embodiment of the invention the software may request a customer to provide a minimum data string that will locate the customer, such as a state (of the United States), an address, or ZIP code, as a first step in contacting the organization to access a local office homepage. Using customer-provided data, the system will direct the customer to the branch or local offices near the customer by displaying links to the homepages for these offices, or redirecting the customer to the local office homepage when only one exists. The customer may then contact the branch manager, and if given a URL for a salesperson's homepage, the customer may then review the personal homepage for the salesperson at that branch or office.

Figure 8:
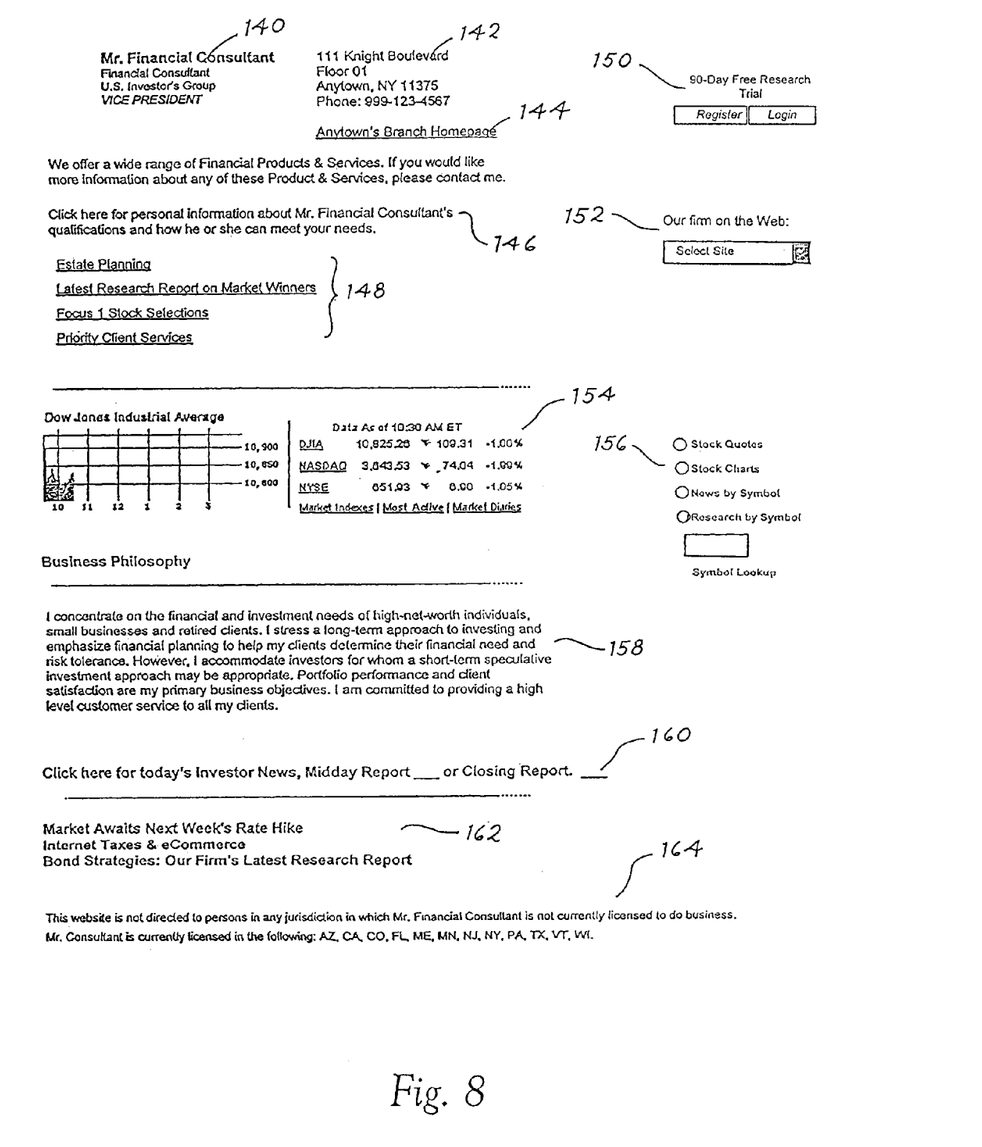
FIG. 8 is an exemplary personal homepage for a financial consultant.

In another embodiment, homepages such as those depicted in FIGS. 8 and 9 are generated and made accessible through the Internet. FIG. 8 depicts an embodiment of a personal homepage for an individual financial consultant. Some of the information for the homepage is harvested from the human resources database. The information displayed via the template may be an electronic equivalent of the financial consultant's business card, including the financial consultant's name and title 140, and his or her office address 142, including at least one way of contacting the consultant, such as a telephone number, an e-mail address or a cell-phone number. The homepage will preferably include a hypertext link 144 to the homepage of the consultant's branch office. Links 146 to e-mail the consultant are another desirable aspect of the homepage, as well as other links 148 to information or services from the financial consultant or the organization employing the consultant. The homepage may include other links or attractions for an investor or potential investor, such as an opportunity to register 150 with the organization or the consultant, more information about other Web-sites 152 for the organization, current market information 154 and individual news or research 156 for the investor or potential investor. The homepage may also use appropriate places for a business philosophy 158 of the financial consultant, investor news 160, or pertinent research reports 162. Finally, the personal homepage may include legal notices and qualifications 164 of individual financial consultants. Such notices and qualifications may be sourced from the existing data residing in the human resources database.

In one embodiment, a financial consultant may "design" his or her own homepage, or tailor it to his or her taste, by selecting components of the homepage. The homepage is desirably limited to a single page, but other embodiments could add more components and use more than a single "page" for display. The components preferably include, personal descriptive information, such as but not limited to, a professional profile, a business philosophy, products and services available from the salesperson, etc. The components may also include live content information that may be periodically (e.g. hourly) updated, such as but not limited to market news, the day's highlights, news headlines, investor news, and entertainment or lifestyle information. Other components may include local events, local seminars, requests for price or news lookups, chart lookups, driving directions to the local office, or a request for contact from a financial consultant. Some of these components may be included in the predefined template and not part of the "customizable" selections available to the financial consultant. The computer system then uses a template to automatically generate a personalized web homepage according to the components selected by the consultant.

In another embodiment, personal homepages for financial organizations, such as a team of financial advisors, or a branch or an office of financial advisors, are generated automatically. Such a homepage is depicted in FIG. 9. In addition to the common components on the homepage template, similar personalized components used for individual financial consultant's home pages may be used for a team or branch homepage as well. The team name and organization 170 may be featured, as well as the team's address and telephone numbers or other means to communicate with the team, such as email links or fax numbers 142. A description 172 of the team and its members may be presented, as well as many of the features shown on an individual homepage. These may desirably include statements of the team's business philosophy 174, availability of financial products or services 148, and research or news stories related to investing 162. Preferably, the team homepage includes an opportunity to interact or link with the team, or obtain other information, such as via a registration link 150, as well as more information 152 about the firm employing the team of financial advisors. Other features, such as current information or stock quotations 156, are also desirable on the team homepage.

As shown, personalized homepages may be automatically generated for individual salespersons, teams, or whole branches. Thus, with little effort, personal homepages may be "on duty" 24 hours a day. Updates are made easily through the same human resources database that is used to provide personal data for the homepages.

Moreover, the customer has available a great amount of information concerning the particular financial consultant and his or her qualifications and expertise, as well as information concerning the organization, on the homepage. Once contact is made, and a financial consultant or branch manager has provided a URL to a customer or potential customer, the information is available whenever the customer contacts the Internet site. Information is available at no cost to the customer beyond any Internet access fee.

Other embodiments of the invention may focus on organizations in non-financial related industries. For example, an organization of doctors, lawyers, and other professionals may find advantage from a personal presence on the Internet for its professionals. Personal information about highly qualified professionals and how they may be useful to customers is a powerful marketing or public relations tool. Data interesting to a customer or potential customer might include a professional's technical training, degrees, certifications, licenses, relevant experience or expertise, qualifications, and the like. The ability to automatically generate and update personal homepages may be especially helpful to large organizations in such service-related professions, which may have less time than others for "marketing" and other public relations functions on the Internet.

While this invention has been shown and described in connection with the preferred embodiments, it is apparent that certain changes and modifications, in addition to those mentioned above may be made from the basic features of this invention. In addition, there are many different types of computer software and hardware that may be utilized in practicing the invention, and the invention is not limited to the examples described above. Accordingly, it is the intention of the applicants to protect all variations and modifications within the valid scope of the present invention. It is intended that the invention be defined by the following claims, including all equivalents.

We claim:

1. A computer system for generating personal homepages, comprising:

an application server comprising a content management server including a homepage template;

a database of personal data for members of a sales force, the database in communication with the application server, wherein the personal data for the members of the sales force is accessible to the application server to automatically populate said homepage template to generate a personal homepage of a selected member of the sales force, said personal homepage having a unique Uniform Resource Locator (URL) to be provided to a customer as an identification of the selected member of the sales force, and the personal homepage operating as a local portal to allow the customer to access to tailored information and to establish a virtual salesperson-customer relationship;

wherein the database of personal data includes employment status data indicative of the employment status of the members and said application server includes a component for periodically retrieving updated personal data and recognizing said employment status data from the updated personal data wherein the personal homepage for the selected member is automatically disabled from any viewing on the Internet when said employment status data indicates the selected member is not employed by an organization;

a developmental content application server being internally accessible to allow pre-published viewing of personal homepages on a privately accessible network, storing the personal homepage of the selected member upon review by the selected member and posting the personal homepage of the selected member to the Internet after review by a manager; and a production server in communication with the developmental content application server and the database of personal data and operable to post the personal homepage of the selected member for viewing through the Internet after the application server or the developmental content application server receives indicia of approval;

wherein the production server is operable to capture data from the customer viewing the personal homepage, to aggregate the data and make the data available for the members of the sales force; and wherein using geographical data from the customer, a request from the customer is directed to the personal homepage of a member of the sales force near a geographical location of the customer.

2. The computer system of claim 1, wherein the developmental content application server is in contact with the database and the production server and configured to generate, develop, test, store, or experiment with personal homepages.

3. The computer system of claim 1, wherein the personal data includes biographical information.

4. The computer system of claim 1, wherein the personal data includes photos of the members.

5. The computer system of claim 1, wherein the personal homepage includes personal data for a plurality of members of the sales force making up a sales team, the sales team being a subset of the sales force.

6. The computer system of claim 5, wherein the homepages generated for the sales team is populated with a single point of contact.

7. The computer system of claim 1, wherein the application server includes a database containing pre-selected information from one or more of a business philosophy, offered products and offered services, and said pre-selected information is available to populate the homepage.

8. The computer system of claim 1, further comprising live information content servers in communication with the application server, wherein said live information may be selected to populate the homepage.

9. The computer system of claim 8, wherein said live information comprises at least one of news reports, market updates, local seminars, investor information, and lifestyle information.

10. The computer system of claim 1, wherein the members of the sales force are financial consultants, and the organization is a retail investment broker.

11. The computer system of claim 10, further comprising information on selected financial products or services.

12. A method of automatically generating customized personal Web homepages for members of a sales force of an organization using a computer system including a human resource database resident to a privately accessible network, the method comprising the steps of:

providing in a database an existing human resources database loaded with personal data for members of a sales force;

defining a template for a personal homepage;

identifying a member of the sales force;

retrieving from the human resources database the personal data associated with the identified member of the sales force;

automatically generating with a processor a personal homepage for the identified member by populating the template with the personal data retrieved from the human resources database;

receiving an indicia of approval on the personal homepage through the privately accessible network;

storing the personal homepage upon review by the identified member;

posting on a web server the personal homepage after review by a manager;

making said personal homepage accessible for viewing through the Internet;

transmitting to a customer a Uniform Resource Locator (URL) of the personal homepage of the identified member of the sales force;

capturing data from the customer viewing the personal homepage, aggregating the data and making the data available for the members of the sales force; and redirecting a request from the customer received via the internet to a member of the sales force near a geographical location of the customer;

periodically retrieving updated personal data from the human resources database and updating said personal homepage with the updated personal data; and, automatically disabling the personal homepage for any viewing on the Internet when said updated personal data includes data indicating that the member is not employed by the organization.

13. The method of claim 12, wherein said member of a sales force is a financial consultant for an investment broker.

14. The method of claim 12, wherein the personal homepage includes personal data of more than one member of the sales force who work for a sales team.

15. The method of claim 12, wherein the personal data includes biographical information describing the members.

16. The method of claim 12, wherein the personal data includes photos or images of the members.

17. The method of claim 12, wherein the personal homepage is associated with a member who is a manager of a branch office, and the homepage generated represents the branch office of the organization.

18. The method of claim 12, further comprising selecting at least one live information content from a plurality of predetermined information content sources in communication with the computer system, automatically populating the personal homepage with the selected information content.

19. The method of claim 12, further comprising populating said home page with descriptive information about said member wherein said descriptive information is input into the system by said member or said descriptive information is selected from a predetermined list of descriptive information in the system.

20. The method of claim 19, wherein said descriptive information includes information to enhance customer perception of the qualifications of the member of the sales force.

21. The method of claim 19, wherein said descriptive information includes information on products or services available from said member.

* * * * *

UNITED STATES PATENT AND TRADEMARK OFFICE
CERTIFICATE OF CORRECTION

PATENT NO. : 7,739,590 B2
APPLICATION NO. : 10/087158
DATED : June 15, 2010
INVENTOR(S) : Jeffrey A. Stocker et al.

It is certified that error appears in the above-identified patent and that said Letters Patent is hereby corrected as shown below:

In the Drawings

In Figure 8, under "Business Philosophy", in the text block of reference 158, after "for whom a short-term" replace "speculalive" with --speculative--.

In Figure 8, under "Business Philosophy", in the text block of reference 158, before "customer service to all my clients." insert --of--.

In Figure 9, under "Products and Services", after "about any of these" replace "Product" with --Products--.

In the Specification

In column 1, line 41, before "other Internet marketing initiatives." replace "companies" with --company's--.

In column 3, line 11, after "information may" insert --be--.

In column 4, line 15, after "for approval of each" replace "home page" with --homepage--.

In column 4, line 50, before "Preferably, biographical data" replace "Tex." with --TX.--.

In column 5, line 34, before "server 82." replace "Web" with --web--.

In column 5, line 46, after "systems, all three" replace "using utilizing" with --using--.

In column 5, line 48, replace "Tex." with --TX.--.

In column 5, line 54, after "interact with the" replace "Web" with --web--.

Signed and Sealed this
Thirteenth Day of August, 2013

Teresa Stanek Rea
*Acting Director of the United States Patent and Trademark Office*

CERTIFICATE OF CORRECTION (continued)
U.S. Pat. No. 7,739,590 B2

<u>In the Specification (cont'd)</u>

In column 6, line 39, after "primarily as production" replace "Web" with --web--.

In column 7, line 50, before "may be used for a team" replace "home pages" with --homepages--.

<u>In the Claims</u>

In column 10, claim 19, line 51, before "with descriptive information" replace "home page" with --homepage--.